United States Patent
Lin et al.

(10) Patent No.: US 12,282,672 B2
(45) Date of Patent: Apr. 22, 2025

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ling Lin, Yokohama Kanagawa (JP); Tatsuya Haga, Fujisawa Kanagawa (JP); Tatsuo Nitta, Machida Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 63 days.

(21) Appl. No.: 18/451,404

(22) Filed: Aug. 17, 2023

(65) Prior Publication Data
US 2024/0311026 A1   Sep. 19, 2024

(30) Foreign Application Priority Data
Mar. 15, 2023 (JP) .................... 2023-041176

(51) Int. Cl.
| | |
|---|---|
| G06F 12/00 | (2006.01) |
| G06F 3/06 | (2006.01) |
| G11B 5/012 | (2006.01) |
| G11B 20/10 | (2006.01) |
| G11B 5/00 | (2006.01) |

(52) U.S. Cl.
CPC ............ *G06F 3/064* (2013.01); *G06F 3/0614* (2013.01); *G06F 3/0676* (2013.01); *G11B 5/012* (2013.01); *G11B 20/10388* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,218,849 B1 | 12/2015 | Trantham et al. | |
| 11,023,352 B2 | 6/2021 | Gaertner et al. | |
| 2015/0279416 A1* | 10/2015 | Tabata | G11B 5/465 369/13.22 |
| 2018/0012627 A1* | 1/2018 | Burkhardt | G11B 20/105 |
| 2021/0065744 A1 | 3/2021 | Ito | |
| 2022/0301589 A1* | 9/2022 | Obuchi | G11B 5/4806 |

* cited by examiner

*Primary Examiner* — Daniel D Tsui
(74) *Attorney, Agent, or Firm* — Knobbe, Martens, Olson & Bear, LLP

(57) ABSTRACT

According to one embodiment, a magnetic disk device includes a plurality of magnetic disks including a first recording surface and a second recording surface, a first magnetic head that writes data to the first recording surface, a second magnetic head that writes data to the second recording surface and a controller that includes a counter configured to detect the number of writes of each of the first magnetic head and the second magnetic head, an unwritten detection unit configured to detect an unwritten block from the blocks, and a memory configured to store a first threshold for the number of writes of each of the first magnetic head and the second magnetic head and a second threshold less than or equal to the first threshold.

15 Claims, 12 Drawing Sheets

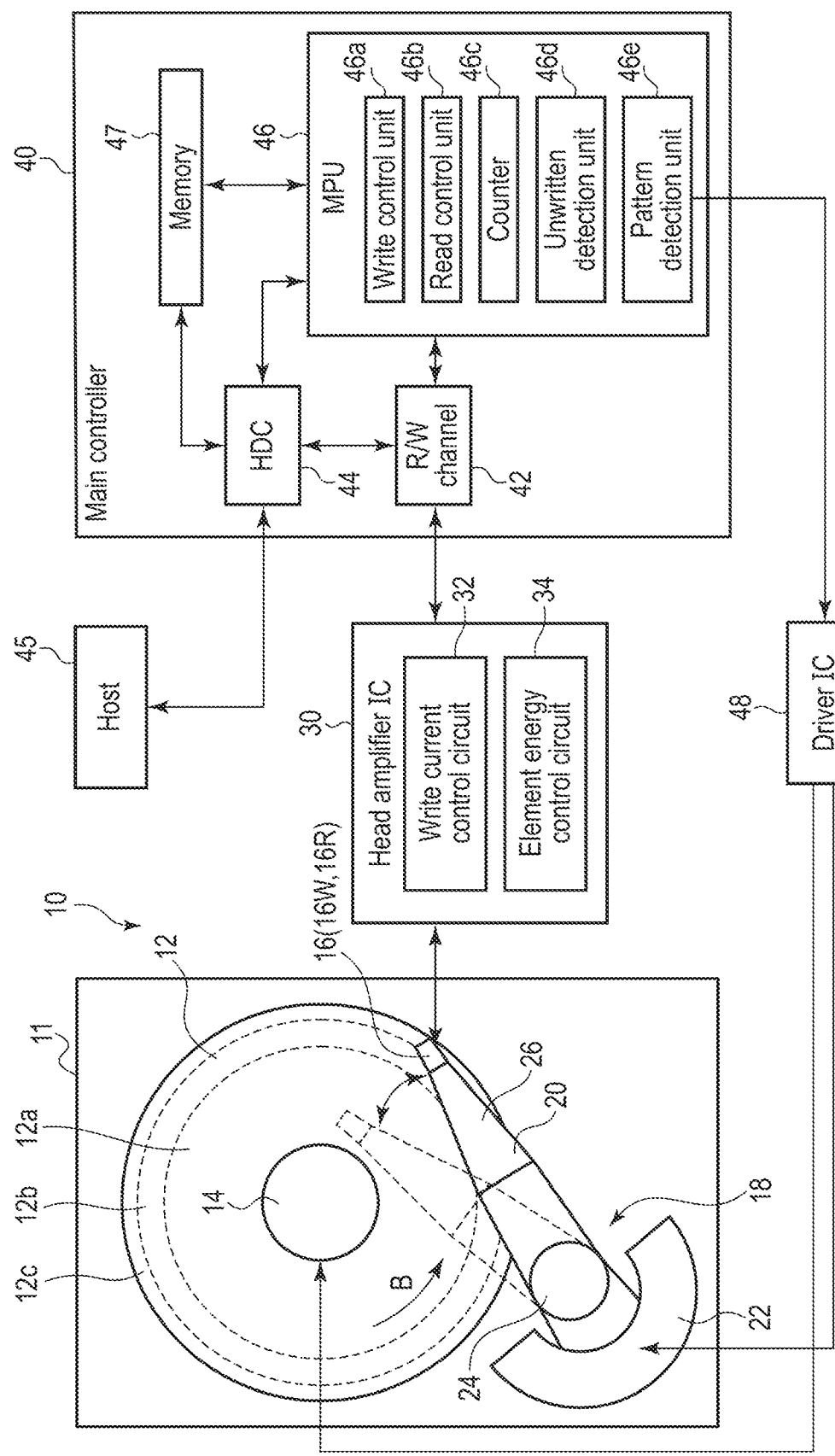
F I G. 1

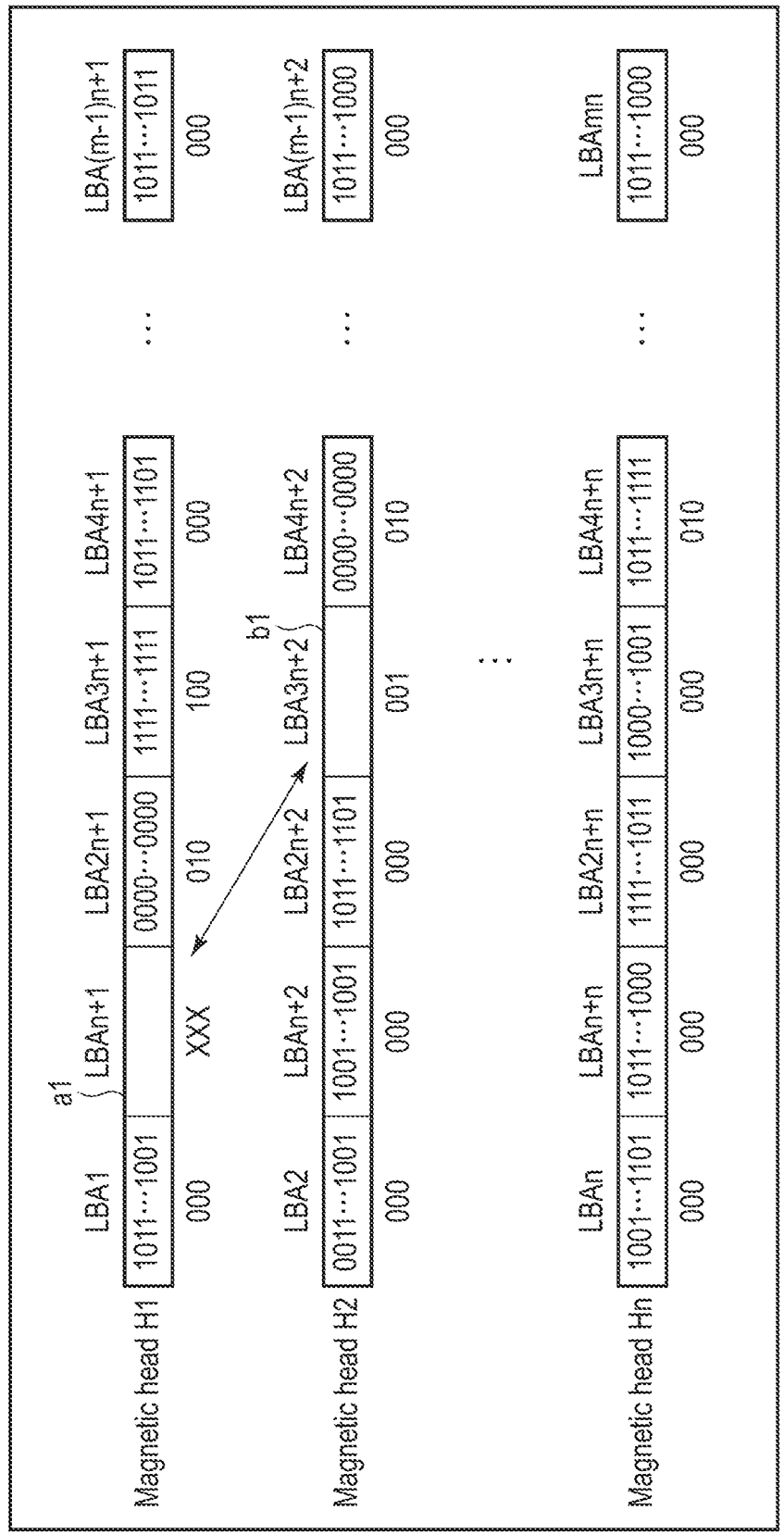
F I G. 4

| | LBA1 | LBA3n+2 a1 { | LBA2n+1 | LBA3n+1 | LBA4n+1 | ... | LBA(m-1)n+1 |
|---|---|---|---|---|---|---|---|
| Magnetic head H1 | 1011···1001 | | 0000···0000 | 1111···1111 | 1011···1101 | ... | 1011···1011 |
| | 000 | XXX | 010 | 100 | 000 | | 000 |

| | LBA2 | LBAn+2 | LBA2n+2 | LBAn+1 b1 | LBA4n+2 | ... | LBA(m-1)n+2 |
|---|---|---|---|---|---|---|---|
| Magnetic head H2 | 0011···1001 | 1001···1001 | 1011···1101 | 1001···1101 | 0000···0000 | ... | 1011···1000 |
| | 000 | 000 | 000 | 000 | 010 | | 000 |

| | LBAn | LBAn+n | LBA2n+n | LBA3n+n | LBA4n+n | ... | LBAmn |
|---|---|---|---|---|---|---|---|
| Magnetic head Hn | 1001···1101 | 1011···1000 | 1111···1011 | 1000···1001 | 1011···1111 | ... | 1011···1000 |
| | 000 | 000 | 000 | 000 | 010 | | 000 |

F I G. 5

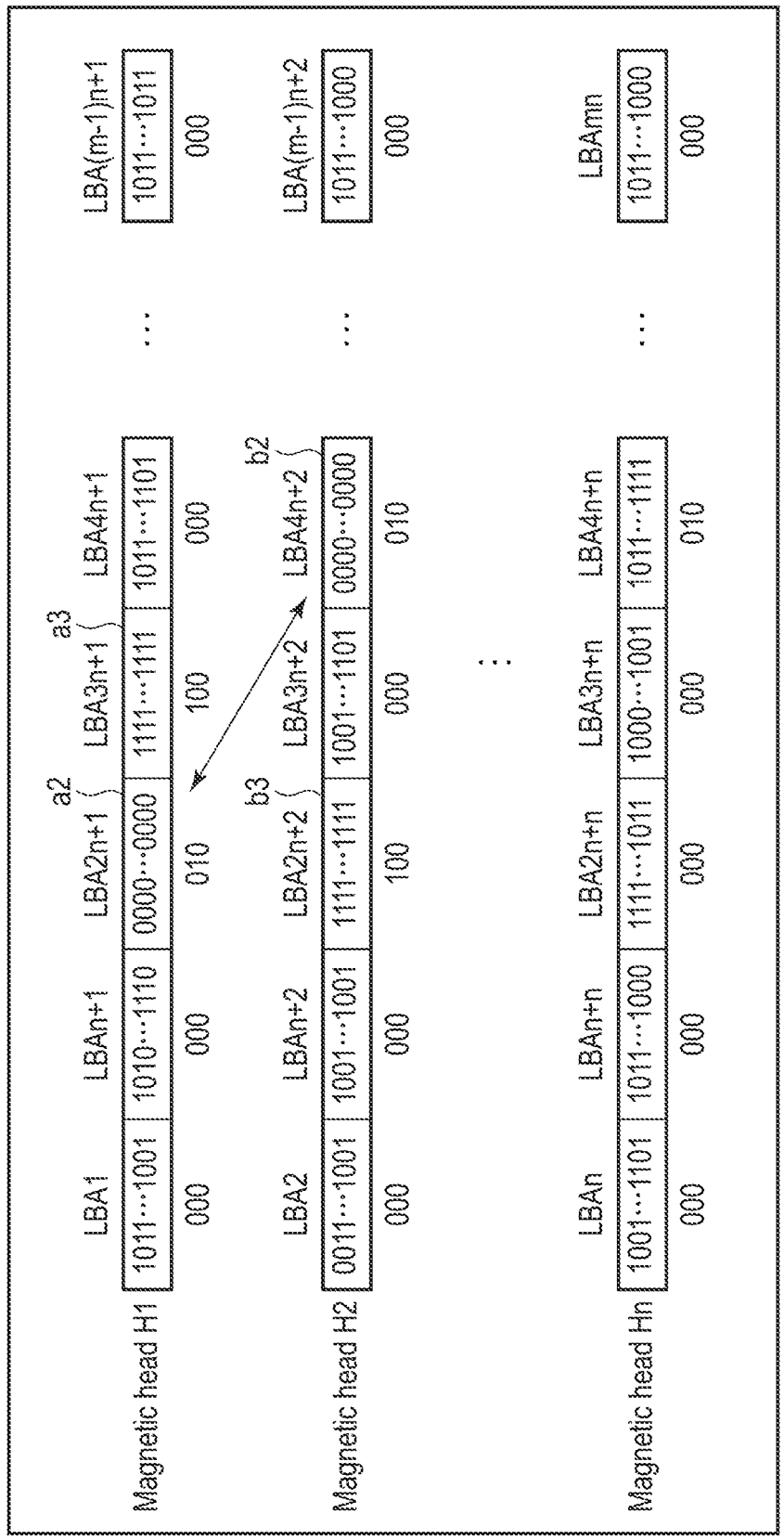
F I G. 6

| | LBA1 | LBAn+1 | | LBA4n+2 | LBA3n+1 | LBA4n+1 | ... | LBA(m-1)n+1 |
|---|---|---|---|---|---|---|---|---|
| Magnetic head H1 | 1011⋯1001 | 1010⋯1110 | | 0000⋯0000 | 1111⋯1111 | 1011⋯1101 | ... | 1011⋯1011 |
| | 000 | 000 | | 010 | 100 | 000 | | 000 |
| | | | | | a2 a3 | | | |
| | LBA2 | LBAn+2 | | LBA2n+2 | LBA3n+2 | LBA2n+1 | ... | LBA(m-1)n+2 |
| Magnetic head H2 | 0011⋯1001 | 1001⋯1001 | | 1111⋯1111 | 1001⋯1101 | 1010⋯1001 | ... | 1011⋯1000 |
| | 000 | 000 | | 100 | 000 | 000 | | 000 |
| | | | | b3 b2 | | | | |
| | LBAn | LBAn+n | | LBA2n+n | LBA3n+n | LBA4n+n | ... | LBAmn |
| Magnetic head Hn | 1001⋯1101 | 1011⋯1000 | | 1111⋯1011 | 1000⋯1001 | 1011⋯1111 | ... | 1011⋯1000 |
| | 000 | 000 | | 000 | 000 | 010 | | 000 |

F I G. 7

MAGNETIC DISK DEVICE

CROSS-REFERENCE TO RELATED APPLICATIONS

This application is based upon and claims the benefit of priority from Japanese Patent Application No. 2023-041176, filed Mar. 15, 2023, the entire contents of which are incorporated herein by reference.

FIELD

Embodiments described herein relate generally to a magnetic disk device.

BACKGROUND

A magnetic disk device includes a plurality of magnetic disks and a plurality of magnetic heads that write data to the magnetic disks. For the magnetic disk device, in order to realize high recording density, an energy assisted recording type such as a microwave assisted magnetic recording type (MAMR) or a heat assisted magnetic recording type (HAMR) is used, but it is known that write performance of the magnetic head deteriorates in accordance with the number of writes.

In general wear leveling, data concentration is suppressed by monitoring a write status in a recording region of the magnetic disk and preferentially writing data to a vacant region. However, in the algorithm described above, in a specific magnetic head, the number of writes may increase and a lifespan may be shortened.

BRIEF DESCRIPTION OF THE DRAWINGS

FIG. 1 is a block diagram illustrating a configuration of a magnetic disk device according to an embodiment.

FIG. 4 is a diagram illustrating an example of control at the time of writing by the magnetic disk device according to the embodiment.

FIG. 5 is a diagram for describing an example of control at the time of writing of the magnetic disk device according to the embodiment, subsequently to FIG. 4.

FIG. 6 is a diagram illustrating an example of control at the time of writing by the magnetic disk device according to the embodiment.

FIG. 7 is a diagram illustrating an example of control at the time of writing by the magnetic disk device according to the embodiment, subsequently to FIG. 6.

DETAILED DESCRIPTION

Figure 2:
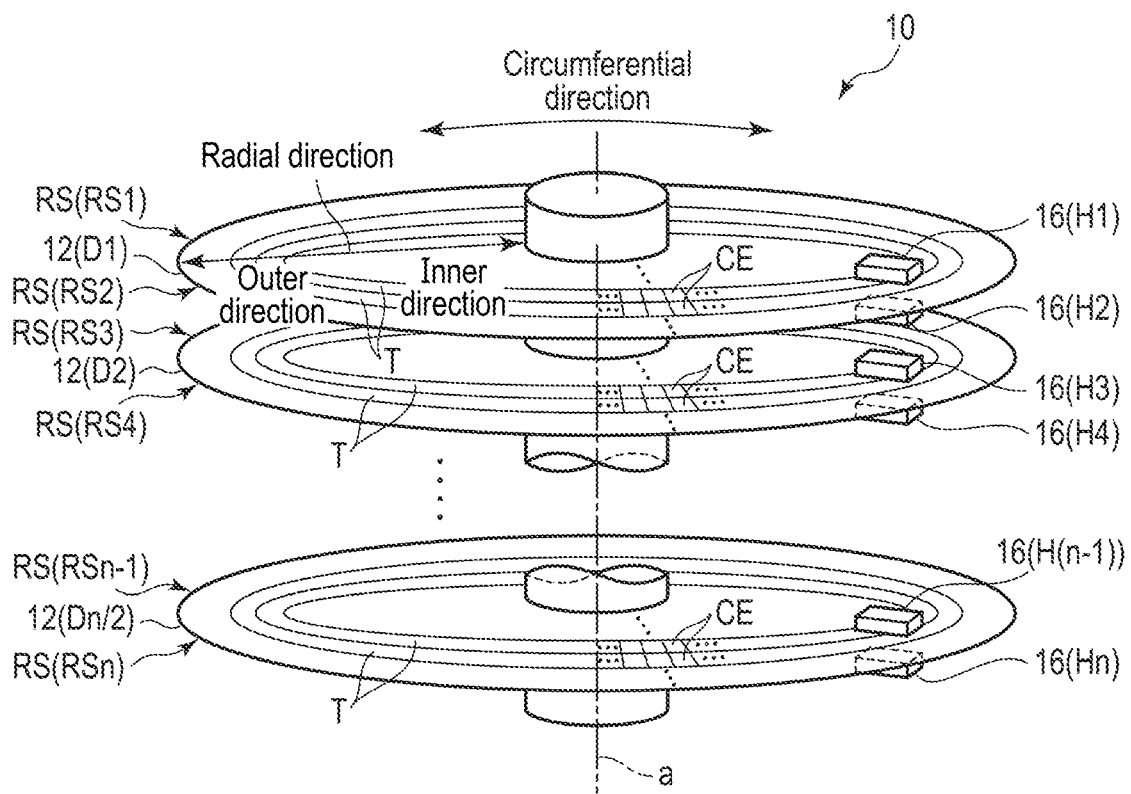
FIG. 2 is a perspective view illustrating a magnetic head and a magnetic disk in the magnetic disk device of the embodiment.

Embodiments will be described hereinafter with reference to the accompanying drawings.

In general, according to one embodiment, a magnetic disk device includes a plurality of magnetic disks, at least one of the plurality of magnetic disks including a first recording surface including a plurality of blocks to which logical block addresses are allocated and at least one of the plurality of magnetic disks including a second recording surface including a plurality of blocks to which logical block addresses are allocated, a first magnetic head that writes data to the first recording surface, a second magnetic head that writes data to the second recording surface, and a controller that includes a counter configured to detect the number of writes of each of the first magnetic head and the second magnetic head, an unwritten detection unit configured to detect an unwritten block from the plurality of blocks, and a memory configured to store a first threshold for the number of writes of each of the first magnetic head and the second magnetic head and a second threshold less than or equal to the first threshold. The controller performs control to determine whether or not the number of writes of the first magnetic head configured to write data to a first block exceeds the first threshold when a command to write data to the first block of the first recording surface among the plurality of blocks is received, write data to the first block by the first magnetic head in a case where the number of writes of the first magnetic head does not exceed the first threshold, determine whether or not the number of writes of the second magnetic head exceeds the second threshold in a case where the number of writes of the first magnetic head exceeds the first threshold, write data to the first block by the first magnetic head in a case where the number of writes of the second magnetic head exceeds the second threshold, determine whether or not there is an unwritten second block on the second recording surface in a case where the number of writes of the second magnetic head does not exceed the second threshold, write data to the first block by the first magnetic head in a case where there is no second block, and exchange a logical block address allocated to the first block and a logical block address allocated to the second block, and write data to the second block by the second magnetic head in a case where there is the second block.

Hereinafter, a magnetic disk device according to an embodiment will be described with reference to the drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention.

Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a block diagram illustrating a configuration of a magnetic disk device 10 according to the embodiment.

As illustrated in FIG. 1, the magnetic disk device 10 includes a rectangular housing 11, a magnetic disk 12 as a recording medium disposed in the housing 11, a spindle motor 14 that supports and rotates the magnetic disk 12, and magnetic heads 16.

In the magnetic disk 12, a user data region 12a available from a user, a media cache region 12b for temporarily retaining data (or a command) transferred from a host 45 or the like before being written to a predetermined region of the user data region 12a, and a system area 12c for recording information necessary for system management are allocated as regions to which data can be written.

Note that, the media cache region 12b is not necessarily allocated, and the system area 12c may be allocated to a memory 47 or the like to be described later.

The magnetic heads 16 include a write head 16W that writes data to the magnetic disk 12 and a read head 16R that reads data from the magnetic disk 12.

The magnetic disk device 10 includes a head actuator 18 that moves and positions the magnetic heads 16 to any track on the magnetic disk 12. The head actuator 18 includes a carriage assembly 20 that movably supports the magnetic heads 16, and a voice coil motor (VCM) 22 that rotates the carriage assembly 20.

The carriage assembly 20 includes a bearing 24 rotatably supported by the housing 11 and a plurality of suspensions 26 extending from the bearing 24. The magnetic head 16 is supported by a distal end of each suspension 26.

The magnetic disk device 10 includes a head amplifier IC (preamplifier) 30 that drives the magnetic heads 16, a main controller 40, and a driver IC 48. The head amplifier IC 30 includes a read amplifier, a write current control circuit 32, and an element energy control circuit 34 (not illustrated). The read amplifier amplifies a read signal read from the magnetic disk 12 by the read head 16R and outputs the amplified read signal to the main controller 40 (more specifically, an R/W channel 42 to be described later). The write current control circuit 32 outputs a write current corresponding to a signal output from the R/W channel 42 to the write head 16W. The element energy control circuit 34 is electrically connected to an assist element 200 to be described later, and applies predetermined energy (for example, a current or a voltage) to the assist element 200.

The main controller 40 and the driver IC 48 are formed as, for example, a control circuit board (not illustrated) provided on a back side of the housing 11. The main controller 40 includes the R/W channel 42, a hard disk controller (HDC) 44, a microprocessor (MPU) 46, the memory 47, and the like. The main controller 40 is electrically connected to the VCM 22 and the spindle motor 14 via the driver IC 48. The HDC 44 can be connected to a host computer (host) 45.

The R/W channel 42 is a signal processing circuit of read and write data. The HDC 44 controls data transfer between the host 45 and the R/W channel 42 in accordance with an instruction from the MPU 46. The HDC 44 is electrically connected to the R/W channel 42, the MPU 46, the memory 47, and the like. The memory 47 includes a volatile memory and a nonvolatile memory. For example, the memory 47 includes a buffer memory including a DRAM, a flash memory, and the like. The memory 47 stores programs and parameters necessary for processing of the MPU 46.

The memory 47 stores a first threshold for the number of writes of each magnetic head 16 and a second threshold that is less than or equal to the first threshold. The second threshold may be the same as the first threshold. The first threshold and the second threshold are, for example, 10,000 times or 100,000 times.

The MPU 46 is a main control unit that controls each unit of the magnetic disk device 10. The MPU 46 executes servo control necessary for control of read and write operations and positioning of the magnetic heads 16. The MPU 46 includes a write control unit 46a that controls write processing, a read control unit 46b that controls read processing, a counter 46c that detects the number of writes of the magnetic head 16, an unwritten detection unit 46d that detects whether or not data has been written to each of blocks to be described later, and a pattern detection unit 46e that detects whether or not the data written to the block has a periodic repeated pattern.

Note that, the periodic repeated pattern is, for example, a pattern including only 0, a pattern including only 1, a repeated pattern having regularity, or the like. The repeated pattern having regularity is, for example, a pattern in which 0 and 1 are alternately repeated.

The write control unit 46a controls data write processing in accordance with a command from the host 45 or the like. Specifically, the write control unit 46a controls the VCM 22 via the driver IC 48, disposes the magnetic head 16 at a predetermined position on the magnetic disk 12, and writes data.

The read control unit 46b controls data read processing in accordance with a command from the host 45 or the like. Specifically, the read control unit 46b controls the VCM 22 via the driver IC 48, disposes the magnetic head 16 at a predetermined position on the magnetic disk 12, and writes data.

FIG. 2 is a perspective view illustrating the magnetic head 16 and the magnetic disk 12 of the magnetic disk device 10 according to the embodiment.

As illustrated in FIG. 2, the magnetic disk device 10 includes a plurality of magnetic heads 16 and a plurality of magnetic disks 12. In one example, the magnetic disk device 10 includes n magnetic heads 16 and n/2 magnetic disks 12. The plurality of magnetic heads 16 and the plurality of magnetic disks 12 are positioned side by side along a rotation axis a.

Each magnetic disk 12 has a pair of recording surfaces RS, and includes a plurality of tracks T along a circumferential direction and a plurality of sectors CE formed by dividing the track T in the circumferential direction. The plurality of tracks T are positioned side by side in a radial direction. The sector CE is a storage region to which data is written. The magnetic disk 12 is divided into a plurality of blocks. Each of the plurality of blocks includes at least one sector, and is allocated a logical block address (LBA).

The main controller 40 stores a logical block address allocated to each block in the memory 47.

Based on the result detected by the unwritten detection unit 46d, the main controller 40 stores, in the memory 47, a flag indicating whether or not data has been written to each block in association with a logical block address allocated to each block. In addition, the main controller 40 stores, in the memory 47, a flag indicating whether or not the pattern of the data written to each block is a predetermined pattern in association with the logical block address allocated to each block based on the result detected by the pattern detection unit 46e.

Each magnetic head 16 faces one recording surface RS. The main controller 40 can individually control the plurality of magnetic heads 16. Specifically, the main controller 40 can write data to a recording surface RS1 of the magnetic disk 12 by controlling the head amplifier IC 30 by the write control unit 46a and driving any magnetic head 16 (for example, a magnetic head H1).

Figure 3:
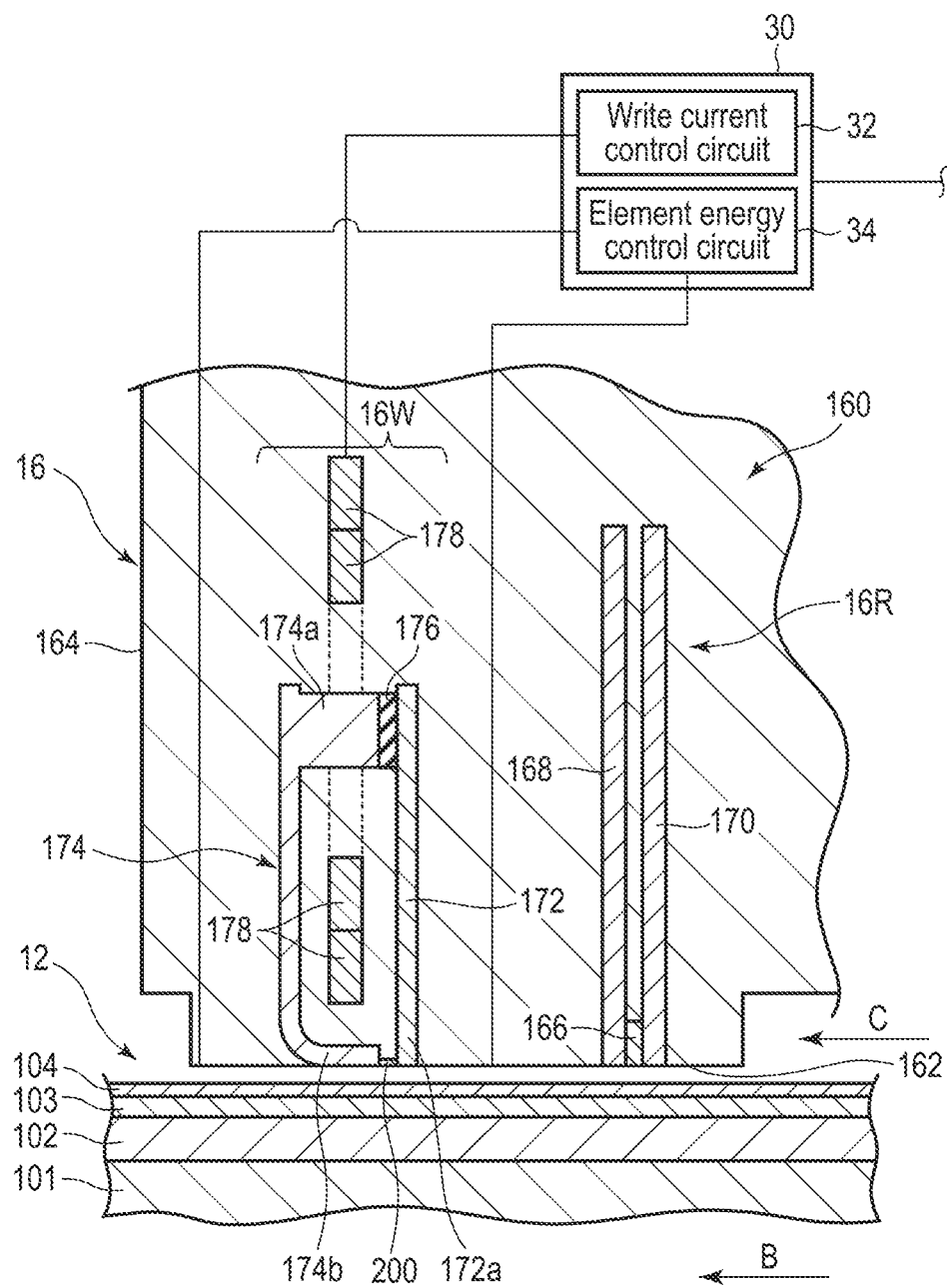
FIG. 3 is an enlarged cross-sectional view illustrating an example of the magnetic disk and the magnetic head according to the embodiment.

FIG. 3 is an enlarged cross-sectional view illustrating an example of the magnetic disk 12 and the magnetic head 16 according to the embodiment. Note that, in FIG. 3, a rotation direction B of the magnetic disk 12 coincides with a direction of an air flow C.

As illustrated in FIG. 3, in the magnetic disk 12, a substrate 101, a soft magnetic layer 102, a magnetic recording layer 103, and a protective film 104 are sequentially stacked. The substrate 101 is made of a disk-shaped non-magnetic material. The soft magnetic layer 102 is positioned on the substrate 101. The soft magnetic layer 102 is made of a material exhibiting soft magnetic characteristics. The magnetic recording layer 103 is positioned on the soft magnetic layer 102. The magnetic recording layer 103 has magnetic anisotropy in a direction perpendicular to a front surface of the magnetic disk 12 (a front surface of the magnetic recording layer 103 or a surface of the protective film 104). The protective film 104 is positioned on the magnetic recording layer 103.

The magnetic head 16 includes a slider 160. The slider 160 includes an air bearing surface (ABS) 162 facing the front surface (for example, protective film 104) of the magnetic disk 12, and a trailing end 164 positioned on an outflow side of the air flow C. A part of the write head 16W and the read head 16R is exposed from the ABS 162.

The read head 16R includes a magnetic film 166, a shield film 168, and a shield film 170. The magnetic film 166 is positioned between the shield film 168 and the shield film 170 to produce a magnetoresistance effect. The shield film 168 is positioned on the trailing end 164 side with respect to the magnetic film 166. The shield film 170 faces the shield film 168. Lower ends of the magnetic film 166, the shield film 168, and the shield film 170 are exposed from the ABS 162.

The write head 16W is provided on the trailing end 164 side of the slider 160 with respect to the read head 16R. The write head 16W includes a main magnetic pole 172, a write shield 174, an insulator 176, a recording coil 178 disposed to wind around a magnetic circuit including the main magnetic pole 172 and the write shield 174 in order to cause a magnetic flux to flow through the main magnetic pole 172, and an assist element 200.

The main magnetic pole 172 is made of a soft magnetic material having a high saturation magnetic flux density. The main magnetic pole 172 generates a recording magnetic field in a direction perpendicular to the front surface of the magnetic disk 12 in order to magnetize the magnetic recording layer 103 of the magnetic disk 12. In one example, the main magnetic pole 172 extends substantially perpendicular to the ABS 162.

A lower surface of a distal end portion 172a of the main magnetic pole 172 on the ABS 162 side is exposed from the ABS 162.

The write shield 174 is made of a soft magnetic material having a high saturation magnetic flux density. The write shield 174 is provided to efficiently close a magnetic path via the soft magnetic layer 102 immediately below the main magnetic pole 172. The write shield 174 is positioned on the trailing end 164 side with respect to the main magnetic pole 172. The write shield 174 includes a connection portion 174a protruding toward the main magnetic pole 172 at an end opposite to the ABS 162. The connection portion 174a is coupled to the main magnetic pole 172 via the insulator 176. The connection portion 174a is electrically insulated from the main magnetic pole 172. Note that, the connection portion 174a is magnetically connected to the main magnetic pole 172.

The write shield 174 is formed in a substantially L-shape, and has a distal end portion 174b facing the distal end portion 172a of the main magnetic pole 172 with a write gap on the ABS 162 side. A lower surface of the distal end portion 174b is exposed from the ABS 162.

In one example, the recording coil 178 is wound around the connection portion 174a. When a signal is written to the magnetic disk 12, a current is caused to flow through the recording coil 178, and thus, the recording coil 178 excites the main magnetic pole 172 and causes a magnetic flux to flow through the main magnetic pole 172.

The assist element 200 is provided between the distal end portion 172a of the main magnetic pole 172 and the distal end portion 174b of the write shield 174. In other words, the assist element 200 is provided in the write gap. The assist element 200 is, for example, a spin torque oscillator (STO). The STO has, for example, a structure in which an underlayer including a non-magnetic conductive layer, a spin injection layer, an intermediate layer, an oscillation layer, and a gap layer including a non-magnetic conductive layer are stacked in order from the distal end portion 172a side of the main magnetic pole 172 to the distal end portion 174b side of the write shield 174.

The assist element 200 generates energy on the magnetic disk 12 by applying a current or a voltage. The energy is, for example, a microwave magnetic field. The assist element 200 applies a microwave magnetic field to the magnetic recording layer 103 of the magnetic disk 12 to reduce a holding force of the magnetic recording layer 103. Accordingly, write performance to the magnetic disk 12 by the write head 16W is enhanced.

On the other hand, as the number of times of writing by generating the energy on the magnetic disk 12 increases, the write capability of the magnetic head 16 gradually decreases. That is, in a case where data is written by using an energy assisted magnetic recording type such as a microwave assisted magnetic recording type or a heat assisted magnetic recording type, the magnetic head 16 deteriorates in accordance with the number of writes.

Hereinafter, an example of a method for selecting the magnetic head 16 at the time of write processing of the magnetic disk device 10 according to the present embodiment will be described with reference to FIGS. 4 and 5.

In FIGS. 4 and 5, n magnetic heads 16 and a plurality of blocks are illustrated side by side. In one example, a block included in the corresponding recording surface is illustrated next to each magnetic head 16. In addition, in FIGS. 4 and 5, a flag indicating a write status of each block is illustrated below each block.

In one example, a flag indicating a block to which data (more specifically, user data) has not been written is 001, a flag indicating a block to which data including only 0 is written is 010, and a flag indicating a block to which data including only 1 is written is 100. Note that, a flag indicating a block in which data including a combination of 1 and 0 is written is 000.

In addition, the data including only 0 and the data including only 1 are, for example, data of a fixed pattern to be written to a block when erase processing or the like is performed.

Hereinafter, the "block to which data has not been written" is also referred to as an "unwritten block".

FIG. 4 is a diagram for describing an example of control at the time of writing by the magnetic disk device 10 according to the embodiment.

As illustrated in FIG. 4, logical block addresses are allocated to a plurality of blocks. Hereinafter, a case where a command to write data to a block a1 to which LBAn+1 is allocated is received will be described as an example.

The block a1 is included in the recording surface RS1 corresponding to the magnetic head H1. In a case where the number of writes of the magnetic head H1 detected by the counter 46c exceeds the first threshold, it is confirmed whether or not there is a magnetic head 16 of which the number of writes is less than the second threshold. In a case where a magnetic head H2 is detected as the magnetic head 16 of which the number of writes is less than the second threshold, the flag of each block on a recording surface RS2 corresponding to the magnetic head H2 is confirmed.

In one example, a flag of a block b1 to which LBA3n+2 is allocated is 001 indicating an unwritten block. In the above case, a logical block address allocated to the block a1 and a logical block address allocated to the block b1 are exchanged. That is, in a case where there is an unwritten block, a logical block address of a block that has received a command to write data and a logical block address of the unwritten block are exchanged.

FIG. 5 is a diagram for describing an example of control at the time of writing of the magnetic disk device 10 according to the embodiment, subsequently to FIG. 4.

As illustrated in FIG. 5, the logical block address allocated to the block a1 and the logical block address allocated to the block b1 are exchanged. More specifically, LBA3n+2 is allocated to the block a1, and LBAn+1 is allocated to the block b1.

In a state where the logical block addresses are exchanged as described above, the magnetic head H2 writes data to the block b1. In addition, the item that LBA3n+2 is allocated to the block a1 and the item that LBAn+1 is allocated to the block b1 are stored in the memory 47.

Next, a case where an unwritten block is not included in the recording surface RS2 corresponding to the magnetic head H2 will be described with reference to FIGS. 6 and 7.

FIG. 6 is a diagram illustrating an example of control at the time of writing of the magnetic disk device according to the embodiment. Hereinafter, a case where a command to write data to the block a2 to which LBA2n+1 is allocated is received will be described as an example.

The block a2 is included in the recording surface RS1 corresponding to the magnetic head H1. In a case where the number of writes of the magnetic head H1 detected by the counter 46c exceeds the first threshold, it is confirmed whether or not there is a magnetic head 16 of which the number of writes is less than the second threshold. In a case where a magnetic head H2 is detected as the magnetic head 16 of which the number of writes is less than the second threshold, the flag of each block on a recording surface RS2 corresponding to the magnetic head H2 is confirmed.

In one example, there is no flag indicating an unwritten block on the recording surface RS2 corresponding to the magnetic head H2. That is, there is no unwritten block on the recording surface RS2 corresponding to the magnetic head H2.

At this time, a flag indicating a pattern of data is confirmed for the block on the recording surface RS2 corresponding to the block a2 and the magnetic head H2.

In one example, it is possible to confirm whether or not the data includes only 0 or only 1 with the flag. A flag of the block a2 is 010 indicating that data of a pattern of only 0 is written. In addition, the recording surface RS2 corresponding to the magnetic head H2 includes a block b2 in which the same flag (010) as the block a2 is set. LBA4n+2 is allocated to the block b2.

In the above case, a logical block address allocated to the block a2 and a logical block address allocated to the block b2 are exchanged. That is, in a case where predetermined data having a periodic repeated pattern is written to a block (in one example, the block a2) that has received a command to write data and the recording surface RS corresponding to the magnetic head 16 having a small number of writes includes a block (in one example, the block b2) in which the identical data as the block has been written, the logical block address allocated to the block that has received the command to write data and the logical block address allocated to the block in which the identical data as the block that has received the command to write data has been written are exchanged.

FIG. 7 is a diagram illustrating an example of control at the time of writing by the magnetic disk device according to the embodiment, subsequently to FIG. 6.

As illustrated in FIG. 7, the logical block address allocated to the block a2 and the logical block address allocated to the block b2 are exchanged. More specifically, LBA4n+2 is allocated to the block a2, and LBA2n+1 is allocated to the block b2.

In a state where the logical block addresses are exchanged as described above, the magnetic head H2 writes data to the block b2. In addition, the item that LBA4n+2 is allocated to the block a2 and the item that LBA2n+1 is allocated to the block b2 are stored in the memory 47.

In the present embodiment, the case where the flag of the block a2 and the flag of the block b2 are 010 has been described as an example. Note that, in a case where there is a block with a flag of 100 on the recording surface RS1 corresponding to the magnetic head H1 and there is a block with a flag of 100 on the recording surface RS2 corresponding to the magnetic head H2, similar processing is performed.

For example, in FIGS. 6 and 7, in a case where a command to write data to a block a3 is received, a logical block address allocated to the block a3 and a logical block address allocated to the block b3 are exchanged, and data is written to the block b3 by the magnetic head H2.

Note that, the flag is not limited to indicating a block in which data including only 0 or data including only 1 is written, and may be a repeated pattern having regularity. For example, the flag may be a flag indicating a block to which data alternately repeating 0 and 1, such as "0101 . . . 1010", is written. In other words, the flag may be a flag indicating a block to which data having a periodic repeated pattern is written.

Next, a procedure when the magnetic head 16 in the write processing of the magnetic disk device 10 according to the present embodiment is selected will be described with reference to FIGS. 8 to 11.

Figure 8:
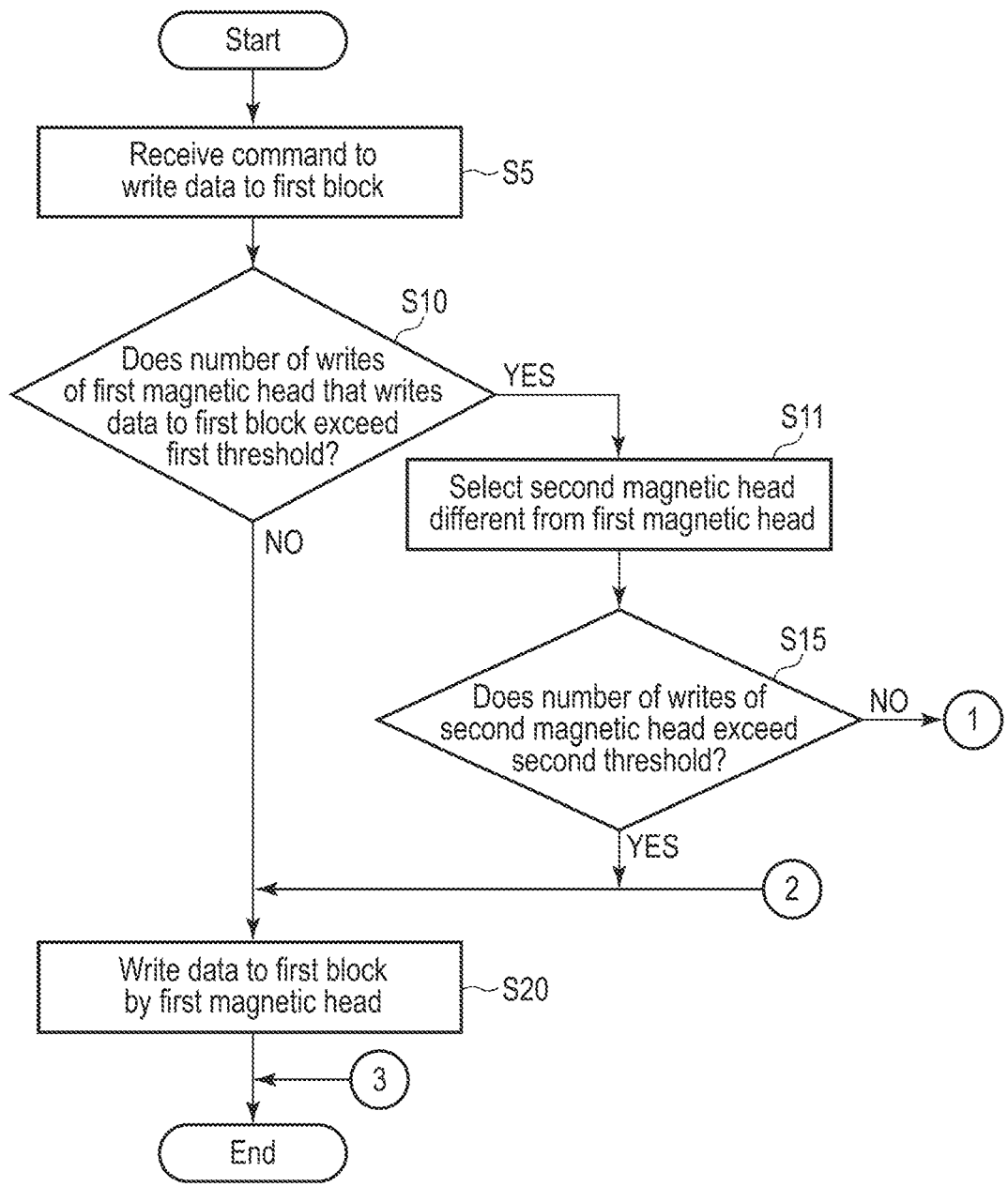
FIG. 8 is a flowchart illustrating an example of a procedure of write processing of the magnetic disk device according to the embodiment.
Figure 9:
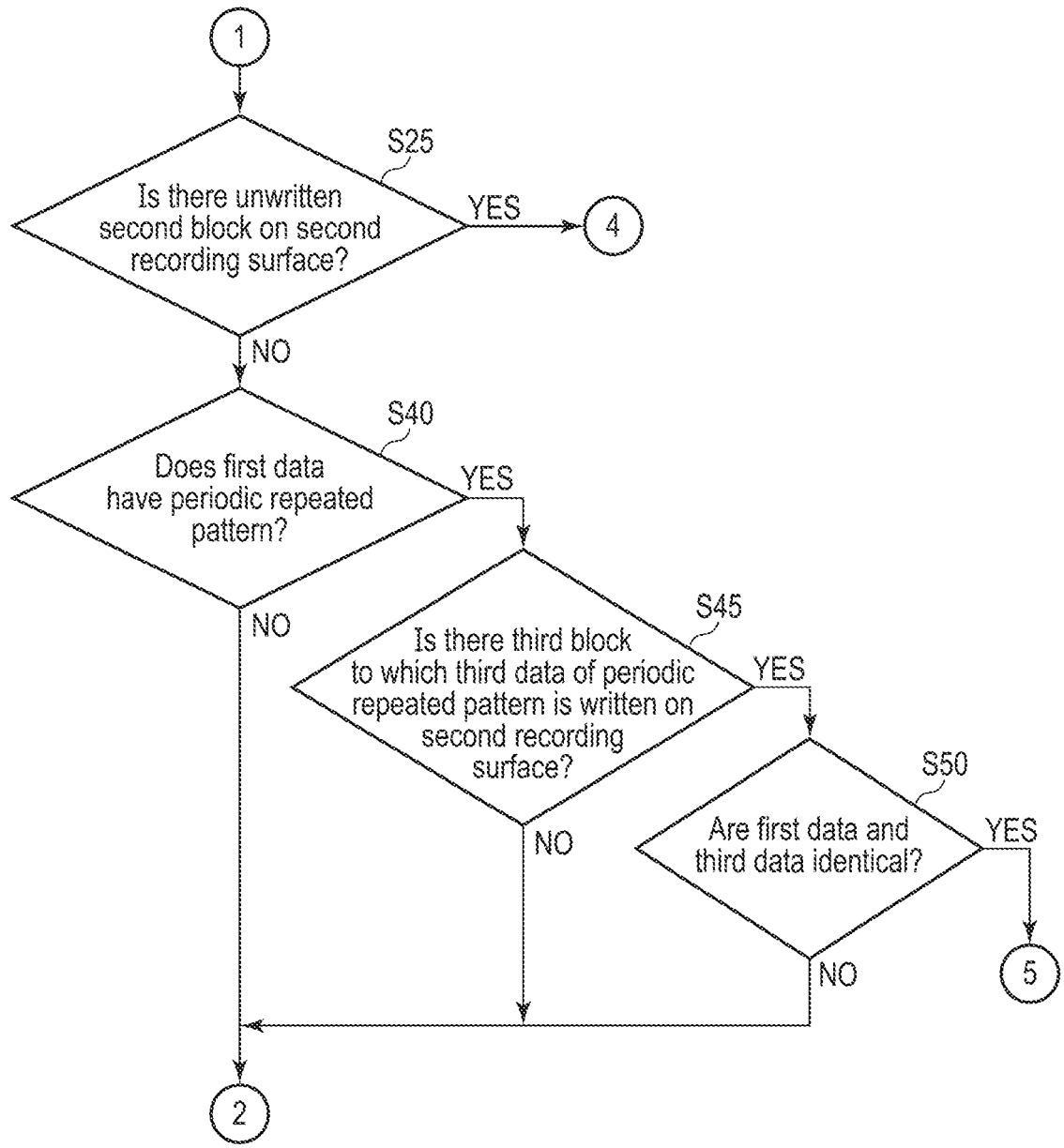
FIG. 9 is a flowchart illustrating an example of the procedure of the write processing of the magnetic disk device according to the embodiment, subsequently to FIG. 8.
Figure 10:
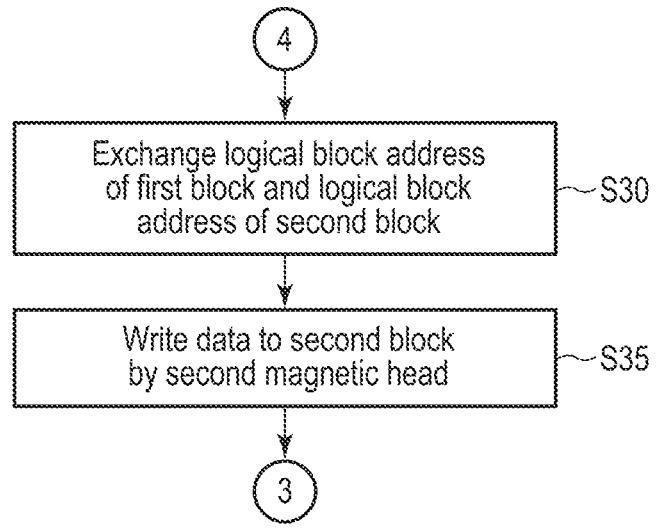
FIG. 10 is a flowchart illustrating an example of the procedure of the write processing of the magnetic disk device according to the embodiment, subsequently to FIG. 9.
Figure 11:
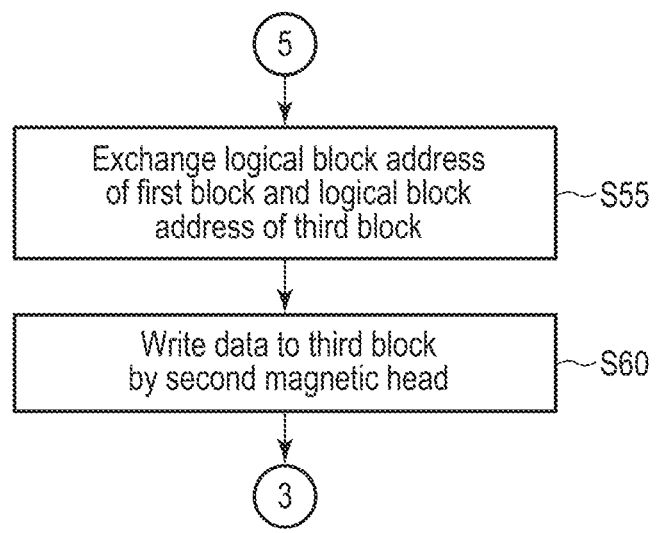
FIG. 11 is a flowchart illustrating an example of the procedure of the write processing of the magnetic disk device according to the embodiment, subsequently to FIG. 9.

FIG. 8 is a flowchart illustrating an example of the procedure of the write processing of the magnetic disk device 10 according to the embodiment. FIG. 9 is a flowchart illustrating an example of the procedure of the write processing of the magnetic disk device 10 according to the embodiment, subsequently to FIG. 8. FIG. 10 is a flowchart illustrating an example of the procedure of the write processing of the magnetic disk device 10 according to the embodiment, subsequently to FIG. 9. FIG. 11 is a flowchart illustrating an example of the procedure of the write processing of the magnetic disk device 10 according to the embodiment, subsequently to FIG. 9.

As illustrated in FIGS. 8 to 11, when the write processing is started and a command to write data to a first block on a first recording surface to be written by a first magnetic head among a plurality of blocks is received (S5), the main controller 40 determines whether or not the number of writes of the first magnetic head that writes data to the first block exceeds the first threshold (S10). In a case where the number of writes of the first magnetic head does not exceed the first threshold, data is written to the first block by the first magnetic head (S20), and the write processing is ended.

In a case where the number of writes of the first magnetic head exceeds the first threshold (S10), the main controller 40 selects a second magnetic head different from the first magnetic head (S11), and determines whether or not the number of writes of the second magnetic head exceeds the second threshold (S15).

In a case where the number of writes of the second magnetic head exceeds the second threshold (S15), step S20 is executed.

Note that, in a case where the number of writes of the second magnetic head exceeds the second threshold and there are a plurality of magnetic heads 16 different from the first magnetic head in step S15, processing of selecting a third magnetic head different from the first magnetic head and the second magnetic head and determining whether or not the number of writes of the third magnetic head exceeds the second threshold may be performed. That is, in a case where the selected magnetic head 16 exceeds the second threshold and there are magnetic heads 16 (hereinafter, referred to as "unselected magnetic heads") that have not yet been selected, the magnetic head 16 may be selected from the unselected magnetic heads 16, and it may be determined whether or not the selected magnetic head 16 exceeds the second threshold. The above selection and determination processing may be repeatedly performed until there is no unselected magnetic head 16, or until it is determined that the selected magnetic head 16 does not exceed the second threshold.

In addition, the magnetic heads 16 may be selected in the order of closing from the first magnetic head. In this case, for example, the second magnetic head is the magnetic head 16 closest to the first magnetic head, and the third magnetic head is the magnetic head 16 next closest to the first magnetic head after the second magnetic head. The magnetic head 16 that is closest to the first magnetic head and does not exceed the second threshold can be efficiently specified by selecting the magnetic heads as described above. Note that, the method for selecting the second magnetic head 16 is not limited to the above method.

Hereinafter, although a case where the number of writes of the second magnetic head does not exceed the second threshold in step S15 will be described, in a case where selection and determination are performed until it is determined that the magnetic head 16 selected as described above does not exceed the second threshold, the "second magnetic head" can be read as the "selected magnetic head".

In a case where the number of writes of the second magnetic head does not exceed the second threshold (S15), it is determined whether or not there is an unwritten second block on a second recording surface to be written by the second magnetic head (S25). In a case where there is the second block (S25), the main controller 40 exchanges the logical block address allocated to the first block and the logical block address allocated to the second block (S30), writes data to the second block by the second magnetic head (S35), and ends the write processing.

Note that, in step S25, in a case where there are a plurality of unwritten blocks on the second recording surface, for example, a block having a number of a smallest logical block address may be set as the second block. In a case where it is confirmed whether or not the block corresponds to the second block in ascending order of the logical block addresses, when the second block is defined as described above, the second block can be efficiently determined. Note that, the method for selecting the second block in a case where there are a plurality of unwritten blocks is not limited to the above.

The main controller 40 determines whether or not first data written to the first block has the periodic repeated pattern (S40) in a case where there is no second block (S25), and executes step S20 in a case where the first data does not have the periodic repeated pattern.

In a case where the first data has the periodic repeated pattern (S40), the main controller 40 determines whether or not there is a third block to which third data has the periodic repeated pattern is written on the second recording surface (S45).

Note that, in step S45, in a case where there are a plurality of blocks to which data having a periodic repeated pattern is written on the second recording surface, for example, a block having a smallest logical block address may be set as the third block. In a case where it is confirmed whether or not the block corresponds to the third block in ascending order of the logical block addresses, when the third block is defined as described above, the third block can be efficiently determined. Note that, the method for selecting the third block in a case where there are the plurality of blocks to which data having a periodic repeated pattern is written is not limited to the above.

In a case where there is the third block (S45), the main controller 40 determines whether or not the first data and the third data are identical (S50), and when the first data and the third data are not identical, step S20 is executed.

In a case where the first data and the third data are identical (S40), the main controller 40 exchanges the logical block address allocated to the first block and the logical block address allocated to the third block (S55), writes the data to the third block by the second magnetic head (S60), and ends the write processing.

Note that, step S25 may be processing of determining whether or not there is the second block on the second recording surface based on the flag stored in the memory 47. That is, step S25 may be processing of determining whether or not there is the second block to which the flag indicating the unwritten block is set on the second recording surface.

Step S40 may be processing of determining whether or not the first data has a periodic repeated pattern based on the flag stored in the memory 47. That is, step S40 may be processing of determining whether or not the flag indicating that data of a periodic repeated pattern is written to the first block is set.

Step S45 may be processing of determining whether or not there is the third block to which the third data has been written on the second recording surface based on the flag stored in the memory 47. That is, step S45 may be processing of determining whether there is the block to which the flag indicating that data of a periodic repeated pattern is written is set on the second recording surface.

In addition, in a case where one flag corresponds to one data pattern, the processing may proceed to step S50 without executing steps S40 and S45 after executing step S25. In this case, in step S50, processing of determining whether or not the flag of the first block and the flag of the third block are identical is executed, and in a case where the flags are identical, step S55 is executed. In a case where the flag of the first block and the flag of the third block are not identical (S50), step S20 is executed.

Regarding a relationship between the first recording surface and the second recording surface described in the procedure of the write processing, the first recording surface and the second recording surface may be provided on front and back surfaces of one magnetic disk 12 or may be provided on surfaces of different magnetic disks 12. In FIG. 2, the first recording surface may be the recording surface RS1 and the second recording surface may be the recording surface RS2, or the first recording surface may be the recording surface RS1 and the second recording surface may be a recording surface RS3.

Effects of the present embodiment will be described.

In accordance with the magnetic disk device 10 according to the present embodiment, when the command to write data to the first block is received, the main controller 40 of the magnetic disk device 10 determines whether or not the number of writes of the first magnetic head that writes data to the first block exceeds the first threshold, and determines whether or not there is the second magnetic head of which the number of writes is less than the second threshold in a case where the number of writes exceeds the first threshold.

In a case where there is the second magnetic head, the main controller 40 determines whether or not there is the unwritten second block on the recording surface corresponding to the second magnetic head, and in a case where there is the second block, the logical block address allocated to the first block and the logical block address allocated to the second block are exchanged, and data is written to the second block by the second magnetic head.

On the other hand, in a case where there is no second magnetic head, the main controller 40 determines whether or not the first data written to the first block has the periodic repeated pattern, and in a case where the first data has the periodic repeated pattern, the main controller determines whether or not there is the third block to which the third data having the periodic repeated pattern is written on the recording surface corresponding to the second magnetic head.

In a case where there is the third block, the main controller 40 determines whether or not the first data and the third data are identical, and in a case where the first data and the third data are identical, the logical block address allocated to the first block and the logical block address allocated to the third block are exchanged, and data is written to the third block by the second magnetic head.

Accordingly, since writing is performed by the second magnetic head having a small number of writes instead of the first magnetic head having a large number of writes, the number of writes in the plurality of magnetic heads 16 can be smoothed.

In addition, in general, in a case where data is written to the written block while the logical block address of the first block and the logical block address of the written block to which data having the unknown data pattern is written are exchanged, it is necessary to perform a first operation of copying data of the written block to another region (for example, the memory 47), a second operation of writing data to the written block, and a third operation of rewriting the copied data to the first block.

Since the second block is unwritten, the first operation of copying the data written to the second block to another region becomes unnecessary. Similarly, since the data pattern of the third block is the same as the data pattern of the first block, the first operation of copying the data written to the third block to another region becomes unnecessary. From the above, it is possible to reduce the cost when data is moved.

In addition, the main controller 40 stores in the memory 47, the flag indicating whether or not each of the plurality of blocks is unwritten in association with the logical block address, and determines whether or not there is the second block based on the flag.

Further, the main controller 40 stores, in the memory, the flag indicating whether or not the data written to each of the plurality of blocks has the periodic repeated pattern in association with the logical block address, and determines whether or not there is the third block based on the flag. Due to the use of the flag as described above, it is easy to specify the second block and the third block.

The data having the periodic repeated pattern is desirably data having only 0 or data having only 1. Accordingly, the flag can be easily managed.

Next, a magnetic disk device 10 according to a modification will be described. In the modification to be described below, identical portions as the portions of the above-described embodiment are denoted by identical reference numerals, detailed description thereof is omitted, and portions different from the portions of the above-described embodiment will be mainly described in detail. In addition, the procedure of the write processing illustrated in FIG. 8 is also identical in a procedure of write processing of the modification.

First Modification

A first modification of the magnetic disk device 10 according to the above embodiment will be described. In the first modification, the magnetic disk device 10 does not include the pattern detection unit 46e.

Hereinafter, a procedure of write processing of the first modification will be described with reference to FIGS. 8 and 12.

Figure 12:
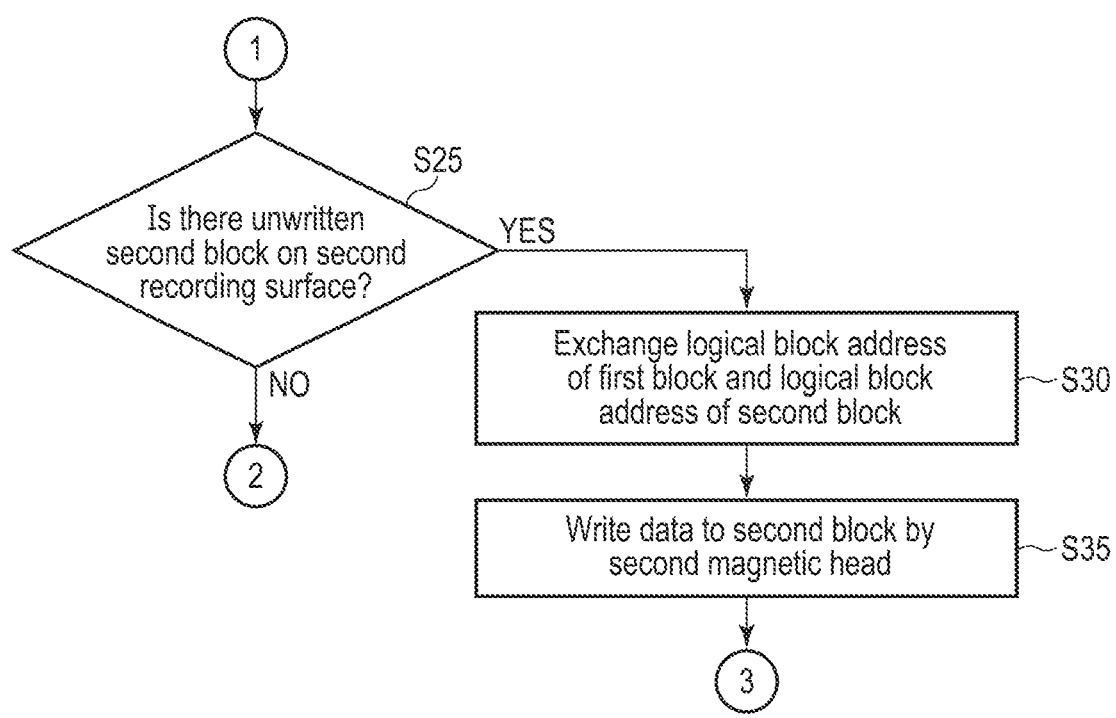
FIG. 12 is a flowchart illustrating an example of a procedure of write processing of a first modification, subsequently to FIG. 8.

FIG. 12 is a flowchart illustrating an example of the procedure of the write processing of the first modification, subsequently to FIG. 8. As illustrated in FIGS. 8 and 12, in a case where the number of writes of the second magnetic head does not exceed the second threshold (S15), the main controller 40 determines whether or not there is the unwritten second block on the second recording surface (S25). In a case where there is no second block, the main controller 40 executes step S20 and ends the write processing.

In a case where there is the unwritten second block (S25), steps S30 and S35 are executed to end the write processing. Note that, kinds of processing in steps S30 and S35 are identical to the write processing in the above embodiment.

In accordance with the first modification of the magnetic disk device 10 having the above-described configuration, similar effects as the effects of the above embodiment can be obtained with a simpler configuration.

Second Modification

A second modification of the magnetic disk device 10 according to the embodiment will be described. In the second modification, the magnetic disk device 10 does not include the unwritten detection unit 46d.

Hereinafter, a procedure of write processing of the second modification will be described with reference to FIGS. 8, 11, and 13. Note that, in the second modification, FIG. 11 is a flowchart illustrating an example of the write processing of the second modification, subsequently to FIG. 13, and kinds of processing of step S55 and step S60 are identical to the write processing in the above embodiment.

Figure 13:
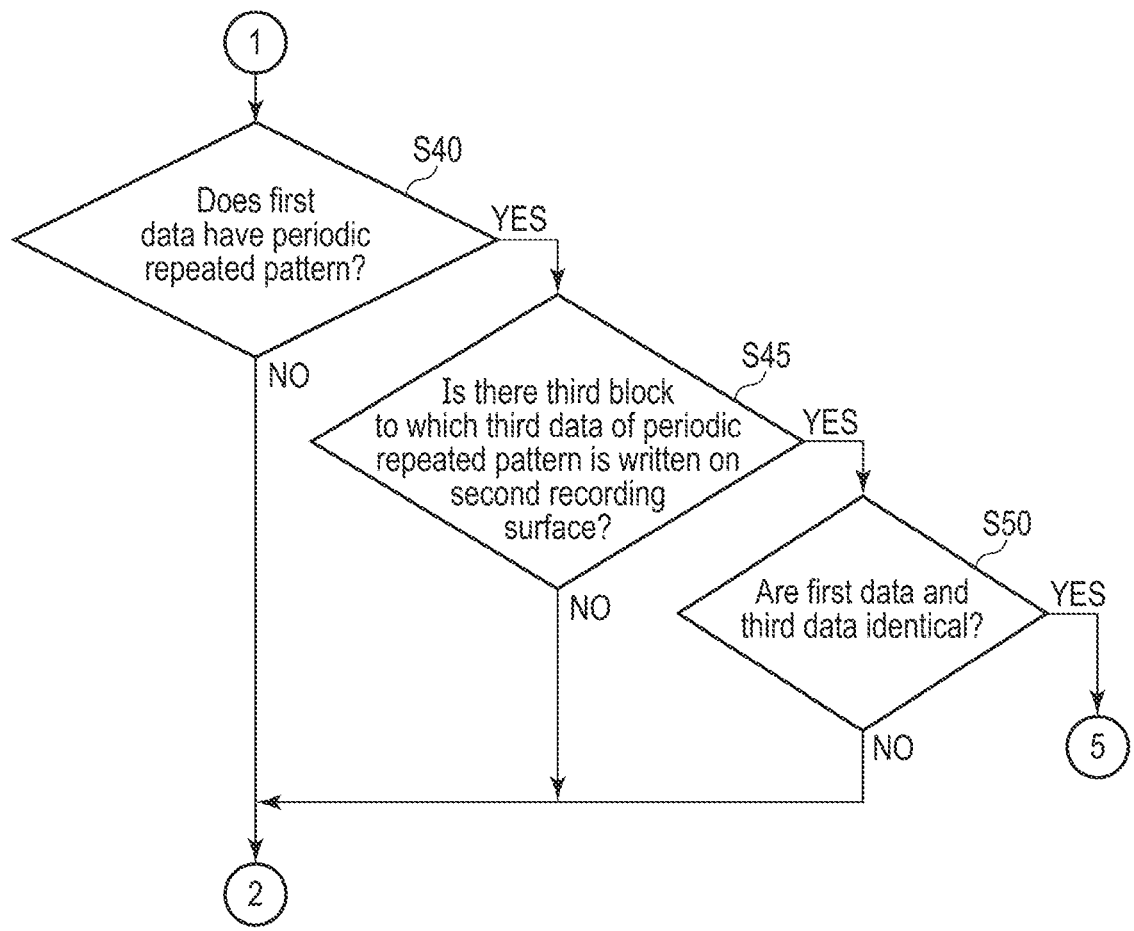
FIG. 13 is a flowchart illustrating an example of a procedure of write processing of a second modification, subsequently to FIG. 8.

As illustrated in FIGS. 8, 11, and 13, in a case where the number of writes of the second magnetic head does not exceed the second threshold (S15), step S40 is executed. In a case where the first data has a periodic repeated pattern (S40), kinds of processing from step S45 to step S60 are executed similarly to the write processing of the above embodiment.

In a case where the first data does not have the periodic repeated pattern (S40), step S20 is executed to end the write processing.

In accordance with the second modification of the magnetic disk device 10 having the above-described configuration, effects similar to the effects of the first modification can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a plurality of magnetic disks, at least one of the plurality of magnetic disks including a first recording surface including a plurality of blocks to which logical block addresses are allocated and at least one of the plurality of magnetic disks including a second recording surface including a plurality of blocks to which logical block addresses are allocated;
a first magnetic head that writes data to the first recording surface;
a second magnetic head that writes data to the second recording surface; and
a controller that includes a counter configured to detect the number of writes of each of the first magnetic head and the second magnetic head, an unwritten detection unit configured to detect an unwritten block from the blocks, and a memory configured to store a first threshold for the number of writes of each of the first magnetic head and the second magnetic head and a second threshold less than or equal to the first threshold,
the controller performing control to
determine whether or not the number of writes of the first magnetic head configured to write data to a first block exceeds the first threshold when a command to write data to the first block of the first recording surface among the blocks is received,
write data to the first block by the first magnetic head in a case where the number of writes of the first magnetic head does not exceed the first threshold,
determine whether or not the number of writes of the second magnetic head exceeds the second threshold in a case where the number of writes of the first magnetic head exceeds the first threshold,
write data to the first block by the first magnetic head in a case where the number of writes of the second magnetic head exceeds the second threshold,
determine whether or not there is an unwritten second block on the second recording surface in a case where the number of writes of the second magnetic head does not exceed the second threshold,
write data to the first block by the first magnetic head in a case where there is no second block, and
exchange a logical block address allocated to the first block and a logical block address allocated to the second block, and write data to the second block by the second magnetic head in a case where there is the second block.

2. The magnetic disk device according to claim 1,
wherein the first recording surface and the second recording surface are provided on one magnetic disk among the plurality of magnetic disks.

3. The magnetic disk device according to claim 1,
wherein the first recording surface and the second recording surface are provided on surfaces of different magnetic disks.

4. The magnetic disk device according to claim 1,
wherein the controller
stores, in the memory, a flag indicating whether or not each of the blocks is unwritten in association with a logical block address, and
determines whether or not there is the second block based on the flag.

5. A magnetic disk device comprising:
a plurality of magnetic disks, at least one of the plurality of magnetic disks including a first recording surface including a plurality of blocks to which logical block addresses are allocated and at least one of the plurality of magnetic disks including a second recording surface including a plurality of blocks to which logical block addresses are allocated;
a first magnetic head that writes data to the first recording surface;
a second magnetic head that writes data to the second recording surface; and
a controller that includes a counter configured to detect the number of writes of each of the first magnetic head and the second magnetic head, a pattern detection unit configured to detect whether or not written data has a periodic repeated pattern, and a memory configured to store a first threshold for the number of writes of each of the first magnetic head and the second magnetic head and a second threshold less than or equal to the first threshold,
the controller performing control to
determine whether or not the number of writes of the first magnetic head configured to write data to a first block exceeds the first threshold when a command to write data to the first block of the first recording surface among the blocks is received,
write data to the first block by the first magnetic head in a case where the number of writes of the first magnetic head does not exceed the first threshold,
determine whether or not the number of writes of the second magnetic head exceeds the second threshold in a case where the number of writes of the first magnetic head exceeds the first threshold, write data to the first block by the first magnetic head in a case where the number of writes of the second magnetic head exceeds the second threshold, determine whether or not first data written to the first block has a periodic repeated pattern in a case where the number of writes of the second magnetic head does not exceed the second threshold, write data to the first block by the first magnetic head in a case where the first data does not have the periodic repeated pattern, determine whether or not there is a third block to which third data having a periodic repeated pattern is written on the second recording surface in a case where the first data has the periodic repeated pattern, write data to the first block by the first magnetic head in a case where there is no third block, determine whether or not the first data and the third data are identical in a case where there is the third block, write data to the first block by the first magnetic head in a case where the first data and the third data are not identical, and exchange a logical block address allocated to the first block and a logical block address allocated to the third block and write data to the third block by the second magnetic head in a case where the first data and the third data are identical.

6. The magnetic disk device according to claim 5, wherein the first recording surface and the second recording surface are provided on one magnetic disk among the plurality of magnetic disks.

7. The magnetic disk device according to claim 5, wherein the first recording surface and the second recording surface are provided on surfaces of different magnetic disks.

8. The magnetic disk device according to claim 5, wherein the controller stores, in the memory, a flag indicating whether or not data written to each of the blocks has a periodic repeated pattern in association with a logical block address, and determines whether or not there is the third block based on the flag.

9. The magnetic disk device according to claim 5, wherein the data having the periodic repeated pattern is data including only 0 or data including only 1.

10. A magnetic disk device comprising:

a plurality of magnetic disks, at least one of the plurality of magnetic disks including a first recording surface including a plurality of blocks to which logical block addresses are allocated and at least one of the plurality of magnetic disks including a second recording surface including a plurality of blocks to which logical block addresses are allocated;

a first magnetic head that writes data to the first recording surface;

a second magnetic head that writes data to the second recording surface; and a controller that includes a counter configured to detect a number of writes of each of the first magnetic head and the second magnetic head, an unwritten detection unit configured to detect an unwritten block from the blocks, a pattern detection unit configured to detect whether or not data written to each of the blocks has a periodic repeated pattern, and a memory configured to store a first threshold for the number of writes of each of the first magnetic head and the second magnetic head and a second threshold less than or equal to the first threshold, the controller performing control to determine whether or not the number of writes of the first magnetic head configured to write data to a first block exceeds the first threshold when a command to write data to the first block of the first recording surface among the blocks is received, write data to the first block by the first magnetic head in a case where the number of writes of the first magnetic head does not exceed the first threshold, determine whether or not the number of writes of the second magnetic head exceeds the second threshold in a case where the number of writes of the first magnetic head exceeds the first threshold, write data to the first block by the first magnetic head in a case where the number of writes of the second magnetic head exceeds the second threshold, determine whether or not there is an unwritten second block on the second recording surface in a case where the number of writes of the second magnetic head does not exceed the second threshold, exchange a logical block address allocated to the first block and a logical block address allocated to the second block and write data to the second block by the second magnetic head in a case where there is the second block, determine whether or not first data written to the first block has a periodic repeated pattern in a case where there is no second block, write data to the first block by the first magnetic head in a case where the first data does not have the periodic repeated pattern, determine whether or not there is a third block to which third data having a periodic repeated pattern is written on the second recording surface in a case where the first data has the periodic repeated pattern, write data to the first block by the first magnetic head in a case where there is no third block, determine whether or not the first data and the third data are identical in a case where there is the third block, write data to the first block by the first magnetic head in a case where the first data and the third data are not identical, and exchange a logical block address allocated to the first block and a logical block address allocated to the third block and write data to the third block by the second magnetic head in a case where the first data and the third data are identical.

11. The magnetic disk device according to claim 10, wherein the first recording surface and the second recording surface are provided on one magnetic disk among the plurality of magnetic disks.

12. The magnetic disk device according to claim 10, wherein the first recording surface and the second recording surface are provided on surfaces of different magnetic disks.

13. The magnetic disk device according to claim 1, wherein the first magnetic head and the second magnetic head output energy to corresponding recording surfaces, and write data.

14. The magnetic disk device according to claim 5, wherein the first magnetic head and the second magnetic head output energy to corresponding recording surfaces, and write data.

15. The magnetic disk device according to claim 10, wherein the first magnetic head and the second magnetic head output energy to corresponding recording surfaces, and write data.

\* \* \* \* \*